US010844140B2

(12) United States Patent
Timbart et al.

(10) Patent No.: US 10,844,140 B2
(45) Date of Patent: *Nov. 24, 2020

(54) PHOSPHONATED POLYSACCHARIDES AND GELS AND PROCESS FOR MAKING SAME

(71) Applicant: RHODIA OPERATIONS, Paris (FR)

(72) Inventors: Laurianne Timbart, Bensalem, PA (US); Gilda Lizarraga, Chesterfield, NJ (US); Gary Woodward, Northwick (GB); Subramanian Kesavan, East Windsor, NJ (US); David James Wilson, Coye la Forte (FR)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,021

(22) Filed: Mar. 6, 2019

(65) Prior Publication Data
US 2019/0202941 A1    Jul. 4, 2019

Related U.S. Application Data

(62) Division of application No. 15/179,103, filed on Jun. 10, 2016, now Pat. No. 10,239,960.

(51) Int. Cl.
| C08B 37/00 | (2006.01) |
| C09K 8/90 | (2006.01) |
| C09K 8/68 | (2006.01) |
| C08L 5/00 | (2006.01) |
| C09K 8/588 | (2006.01) |
| C09K 8/035 | (2006.01) |
| C09K 8/40 | (2006.01) |
| C09K 8/52 | (2006.01) |
| C09K 8/62 | (2006.01) |
| C09K 8/74 | (2006.01) |
| E21B 43/26 | (2006.01) |
| C09K 8/60 | (2006.01) |

(52) U.S. Cl.
CPC .......... C08B 37/00 (2013.01); C08B 37/0096 (2013.01); C08L 5/00 (2013.01); C09K 8/035 (2013.01); C09K 8/40 (2013.01); C09K 8/52 (2013.01); C09K 8/588 (2013.01); C09K 8/62 (2013.01); C09K 8/68 (2013.01); C09K 8/74 (2013.01); C09K 8/90 (2013.01); C09K 8/905 (2013.01); E21B 43/26 (2013.01); C09K 8/602 (2013.01); C09K 8/605 (2013.01); C09K 2208/00 (2013.01); C09K 2208/20 (2013.01)

(58) Field of Classification Search
None
See application file for complete search history.

(56) References Cited

U.S. PATENT DOCUMENTS

| 3,383,307 | A | 5/1968 | Goetz |
| 4,753,659 | A | 6/1988 | Bayerlein et al. |
| 4,932,473 | A | 6/1990 | Borchardt |
| 5,336,316 | A | 8/1994 | Dawson et al. |
| 5,510,038 | A | 4/1996 | Wegmüller |
| 5,563,186 | A | 10/1996 | Thompson |
| 5,679,654 | A | 10/1997 | Tzianabos et al. |
| 6,017,483 | A | 1/2000 | Lin |
| 6,090,242 | A | 7/2000 | Drummond et al. |
| 6,143,443 | A | 11/2000 | Kazacos et al. |
| 6,514,950 | B1 | 2/2003 | Baschong et al. |
| 10,239,960 | B2 * | 3/2019 | Timbart .................. C08B 37/00 |
| 2002/0019447 | A1 | 2/2002 | Renn et al. |
| 2002/0094959 | A1 | 7/2002 | DesRosiers |
| 2002/0188040 | A1 | 12/2002 | Chen et al. |
| 2003/0010929 | A1 | 1/2003 | Priewe et al. |
| 2003/0150805 | A1 | 8/2003 | Collins et al. |
| 2004/0047892 | A1 | 3/2004 | Desrosiers et al. |
| 2004/0067864 | A1 | 4/2004 | Aubay et al. |
| 2004/0185017 | A1 | 9/2004 | Mougin et al. |
| 2005/0065040 | A1 | 3/2005 | Weaver et al. |
| 2005/0283004 | A1 | 12/2005 | Wei et al. |
| 2006/0134717 | A1 | 6/2006 | Tellier et al. |
| 2006/0151172 | A1 | 7/2006 | Hanes, Jr. et al. |
| 2007/0015678 | A1 | 1/2007 | Rodrigues et al. |
| 2007/0179202 | A1 | 8/2007 | Chane-Ching |
| 2007/0187650 | A1 | 8/2007 | Anders et al. |
| 2008/0269083 | A1 | 10/2008 | Argillier et al. |
| 2009/0299172 | A1 | 12/2009 | Corot et al. |
| 2010/0160203 | A1 | 6/2010 | Seebeck et al. |
| 2010/0234233 | A1 | 9/2010 | Sannino et al. |
| 2011/0067601 | A1 | 3/2011 | Fried |
| 2011/0129880 | A1 | 6/2011 | Conners et al. |
| 2011/0245490 | A1 | 10/2011 | Benvegnu et al. |
| 2011/0281105 | A1 | 11/2011 | Campazzi et al. |
| 2013/0157905 | A1 | 6/2013 | Saini et al. |
| 2013/0277608 | A1 | 10/2013 | Tian et al. |
| 2014/0110621 | A1 | 4/2014 | Kerns et al. |
| 2014/0147407 | A1 | 5/2014 | Shastri et al. |

FOREIGN PATENT DOCUMENTS

| CN | 104311683 A | 1/2015 |
| DE | 2050849 A1 | 5/1972 |

(Continued)

OTHER PUBLICATIONS

R. Jayakumar, N. Selvamurugan, S.V. Nair, S. Tokura, H. Tamura; "Preparation methods of phosphorylated chitin and chitosan—An overview"; International Journal of Biological Macromolecules 43 (2008) 221-225.

(Continued)

Primary Examiner — Eric Olson
(74) Attorney, Agent, or Firm — Jarrod N. Raphael; Jericho B. Pacho

(57) ABSTRACT

Products and processes that are related to phosphonated polysaccharide compositions, including phosphonated polysaccharide gels, having a substituent degree of substitution with a lower limit of 0.02 and an upper limit of 3, and having a weight average molecular weight with an upper limit of 5,000,000 g/mole, as well as to oil field application or fracturing fluid compositions comprising such phosphonated polysaccharide compositions.

20 Claims, 1 Drawing Sheet

(56) References Cited

FOREIGN PATENT DOCUMENTS

| | | |
|---|---|---|
| DE | 102005024214 A1 | 12/2006 |
| EP | 0030443 A1 | 6/1981 |
| EP | 0510986 A2 | 10/1992 |
| EP | 0950641 A2 | 10/1999 |
| EP | 1072252 A2 | 1/2001 |
| EP | 1074242 A2 | 2/2001 |
| EP | 1992364 A1 | 11/2008 |
| EP | 2532682 A1 | 12/2012 |
| GB | 755461 | 8/1956 |
| GB | 2131471 B | 10/1986 |
| GB | 2204032 A | 11/1988 |
| GB | 2398090 B | 8/2005 |
| GB | 2450269 B | 5/2011 |
| WO | 2005003028 A2 | 1/2005 |
| WO | 2005019230 A2 | 3/2005 |
| WO | WO2009/092740 * | 7/2009 ............... C11D 3/22 |
| WO | 2011134947 A1 | 11/2011 |
| WO | 2013131584 A1 | 9/2013 |
| WO | 2014154348 A1 | 10/2014 |
| WO | WO2015/152914 * | 10/2015 ............... C09K 8/04 |

OTHER PUBLICATIONS

M. Sander and E. Steininger; "Chapter 5: Phosphorylation of Polymers"; Battelle-Institut e.V., Frankfurt am Main, Germany; Seite 2-17 von 17.

\* cited by examiner

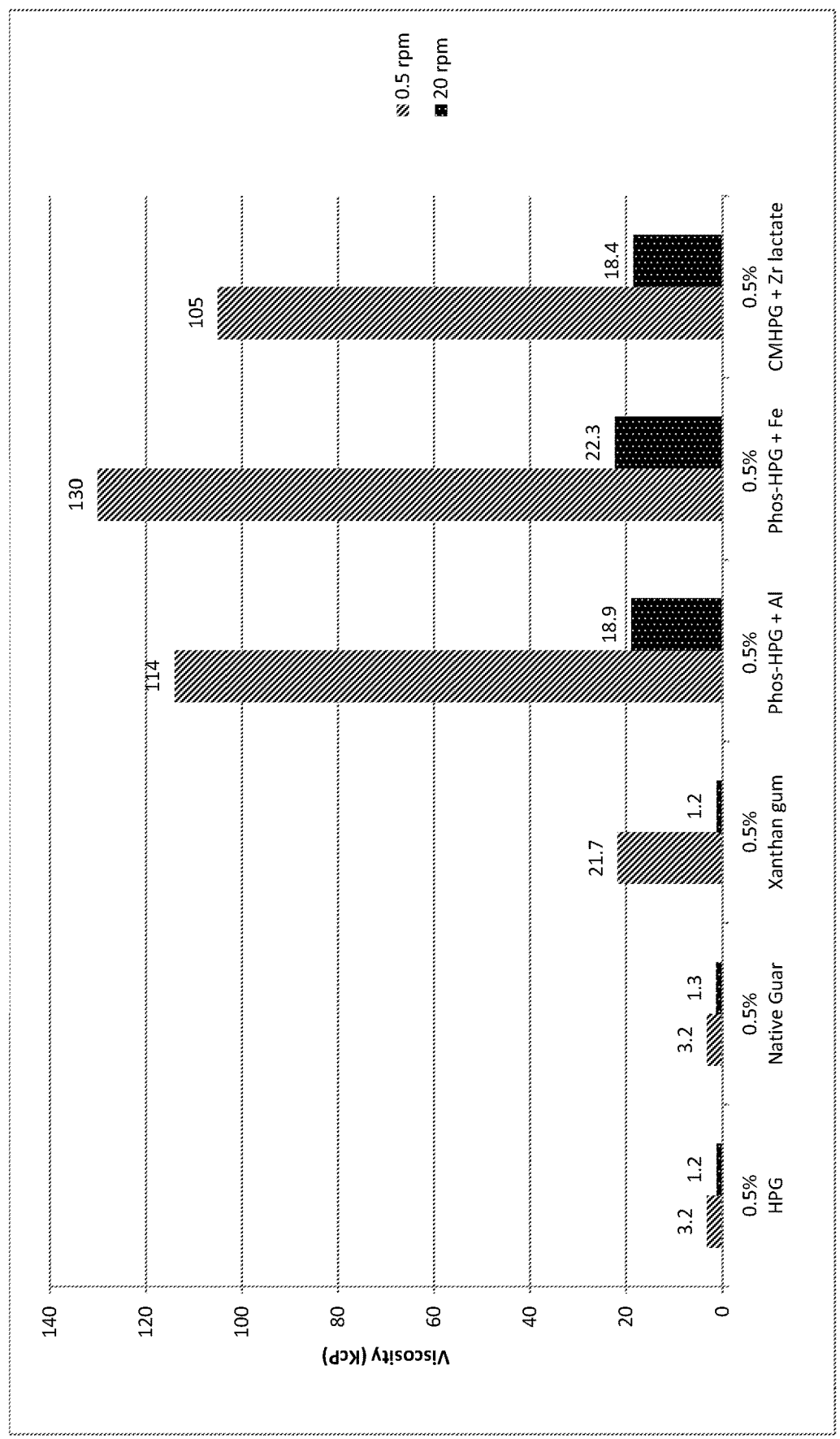

PHOSPHONATED POLYSACCHARIDES AND GELS AND PROCESS FOR MAKING SAME

CROSS-REFERENCE TO RELATED APPLICATIONS

This application is a divisional of U.S. patent application Ser. No. 15/179,103, filed Jun. 10, 2016, which claims the benefit of U.S. Provisional Patent Application No. 62/173,437 filed Jun. 10, 2015, incorporated herein by reference in its entirety.

FIELD OF THE INVENTION

This invention relates to phosphonated polysaccharides and, in particular, to processes to prepare phosphonated polysaccharides and phosphonated polysaccharide gels, in particular phosphonated polysaccharides, including phosphonated guar and phosphonated guar gels.

BACKGROUND OF THE INVENTION

Many times, fluids when used in industrial or commercial applications are viscosified with a polysaccharide to impart desired properties. For example, these viscosified fluids in oil field applications can assist in suspending particulates, and assist in maintaining pressure down-hole. There is a need for improved compositions containing phosphonated polysaccharides and related gels. There is also a need for compositions containing phosphonated polysaccharides, in particular high DS phosphonated polysaccharides, including phosphonated guar, in the agriculture (e.g., seed boosting, germination, adjuvant) markets, home and personal care markets, industrial markets, paper and pulp process markets, mining markets, among other, that are environmentally friendly or provide a sustainability benefit.

SUMMARY OF INVENTION

In one aspect, described herein are phosphonated polysaccharides having a DS of greater than 0.02. In some embodiments, the DS is greater than 0.03, 0.04, 0.05, 0.06, 0.07, 0.08, 0.09, or 0.1. In one embodiment, the DS is greater than 0.3, 0.4, 0.45, 0.5, 0.55, 0.6, 0.65, 0.7, 0.8, 0.9, 1 or, in other embodiments, 1.2. In some embodiments, the degree of substitution has an upper limit of 3, or an upper limit of 2, or an upper limit of 1.7, or an upper limit of 1.5, or an upper limit of 1.3. In some embodiments, the DS has a lower limit of 0.02, 0.03, 0.04, 0.05, 0.06, 0.07, 0.08, 0.09, 0.1, 0.11 or 0.12.

In one aspect, described herein are polysaccharide compositions comprising at least one phosphonated polysaccharide having a substituent degree of substitution (DS) with a lower limit of 0.02 and an upper limit of 3, and having a weight average molecular weight with an upper limit of 10,000,000 g/mole.

In one embodiment, the substituent degree of substitution (DS) of the polysaccharide has a lower limit of 0.02, or in another embodiment a lower limit of 0.03, or in another embodiment a lower limit of 0.04, or in another embodiment a lower limit of 0.05, or in another embodiment a lower limit of 0.06, or in another embodiment a lower limit of 0.07, or in another embodiment a lower limit of 0.08, or in another embodiment a lower limit of 0.09, or in another embodiment a lower limit of 0.2, or in another embodiment a lower limit of 0.4, or in another embodiment a lower limit of 0.5, or in another embodiment a lower limit of 0.7, or in another embodiment a lower limit of 0.8, or in another embodiment a lower limit of 1, or in another embodiment a lower limit of 1.1, or in another embodiment a lower limit of 1.2, or in another embodiment a lower limit of 1.4, or in another embodiment a lower limit of 1.5.

In one embodiment, the substituent degree of substitution (DS) of the polysaccharide has an upper limit of 3. In another embodiment, the substituent degree of substitution (DS) of the polysaccharide has an upper limit of 2.5. In another embodiment, the substituent degree of substitution (DS) of the polysaccharide has an upper limit of 2.

In one embodiment, the phosphonated polysaccharide is in gel form. In one embodiment, the phosphonated polysaccharide is a phosphonated guar or a phosphonated guar gel. In one embodiment, the phosphonated polysaccharide is a phosphonated hydroxypropyl guar or a phosphonated hydroxypropyl guar (sometimes referred to herein as "HPG") gel. In one embodiment, the phosphonated polysaccharide is a phosphonated guar or a phosphonated hydroxypropyl guar, or gels thereof.

In one embodiment, the phosphonated polysaccharide is selected from phosphonated guar; phosphonated carboxymethyl guar (CMG); phosphonated hydroxyethyl guar (HEG); phosphonated hydroxypropyl guar (HPG); phosphonated carboxymethylhydroxypropyl guar (CMHPG); phosphonated hydrophobically modified guar (HM guar); phosphonated hydrophobically modified carboxymethyl guar (HMCM guar); phosphonated hydrophobically modified hydroxyethyl guar (HMHE guar); phosphonated hydrophobically modified hydroxypropyl guar (HMHP guar); phosphonated hydrophobically modified carboxymethylhydroxypropyl guar (HMCMHP guar); or any combination thereof.

In one embodiment, the polysaccharide composition further comprises one or more biocides, one or more surfactants, one or more scale inhibitors, one or more stabilizers or any of the foregoing.

In one embodiment, the polysaccharide has a weight average molecular weight with an upper limit of 10,000,000 g/mole. In another embodiment, the polysaccharide has a weight average molecular weight with an upper limit of 7,000,000 g/mole. In another embodiment, the polysaccharide has a weight average molecular weight with an upper limit of 5,000,000 g/mole. In another embodiment, the polysaccharide has a weight average molecular weight with an upper limit of 4,000,000 g/mole.

In another embodiment, the polysaccharide has a weight average molecular weight with an upper limit of 3,700,000 g/mole. In another embodiment, the polysaccharide has a weight average molecular weight with an upper limit of 3,500,000 g/mole. In another embodiment, the polysaccharide has a weight average molecular weight with an upper limit of 3,000,000 g/mole. In another embodiment, the polysaccharide has a weight average molecular weight with an upper limit of 2,500,000 g/mole. In another embodiment, the polysaccharide has a weight average molecular weight with an upper limit of 2,000,000 g/mole.

In another embodiment, the polysaccharide has a weight average molecular weight with an upper limit of 1,000,000 g/mole. In yet another embodiment, the polysaccharide has a weight average molecular weight with an upper limit of 950,000 g/mole. In another embodiment, the polysaccharide has a weight average molecular weight with an upper limit of 800,000 g/mole. In another embodiment, the polysaccharide has a weight average molecular weight with an upper limit of 750,000 g/mole. In another embodiment, the polysaccharide has a weight average molecular weight with an upper limit of 700,000 g/mole. In a further embodiment, the polysaccharide has a weight average molecular weight with an upper limit of 600,000 g/mole. In yet another embodiment, the polysaccharide has a weight average molecular weight with an upper limit of 500,000 g/mole.

In one embodiment, the polysaccharide has a weight average molecular weight with a lower limit of 1,000 g/mole. In one embodiment, the polysaccharide has a weight average molecular weight with a lower limit of 5,000 g/mole. In one embodiment, the polysaccharide has a weight average molecular weight with a lower limit of 15,000 g/mole. In another embodiment, the polysaccharide has a weight average molecular weight with a lower limit of 25,000 g/mole. In another embodiment, the polysaccharide has a weight average molecular weight with a lower limit of 50,000 g/mole. In another embodiment, the polysaccharide has a weight average molecular weight with a lower limit of 75,000 g/mole.

In another embodiment, the polysaccharide has a weight average molecular weight with a lower limit of 100,000 g/mole. In yet another embodiment, the polysaccharide has a weight average molecular weight with a lower limit of 150,000 g/mole. In another embodiment, the polysaccharide has a weight average molecular weight with a lower limit of 200,000 g/mole. In another embodiment, the polysaccharide has a weight average molecular weight with a lower limit of 250,000 g/mole. In another embodiment, the polysaccharide has a weight average molecular weight with a lower limit of 300,000 g/mole. In a further embodiment, the polysaccharide has a weight average molecular weight with a lower limit of 400,000 g/mole. In yet another embodiment, the polysaccharide has a weight average molecular weight with a lower limit of 500,000 g/mole.

In another aspect, described herein are processes to produce a phosphonated polysaccharide comprising the steps of: obtaining an aqueous or semi-aqueous mixture of a polysaccharide; and contacting the mixture with an effective amount of haloalkylphosphonic acid to phosphonate the polysaccharide, whereby the resulting phosphonated polysaccharide has a substituent degree of substitution with a lower limit of 0.02, or in other embodiments, 0.03, or in other embodiments 0.05. In one embodiment, the haloalkylphosphonic acid is a chloroalkylphosphonic acid. In another embodiment, the halo group (i.e., halide) is selected from any one of: fluoride, chloride, bromide or iodide. In another embodiment, the substituent group on the alkylphosphonic acid can be any suitable leaving group, e.g., mesylate or tosylate. In one embodiment, the haloalkylphosphonic acid can be replaced with mesylalkylphosphonic acid or tosylalkylphosphonic acid, wherein the alkyl group is any as described herein.

In one embodiment, the step of contacting the mixture with an effective amount of haloalkylphosphonic acid to phosphonate the polysaccharide is carried out at a temperature of between 60° C. and 90° C., typically between 60° C. and 80° C., more typically between 65° C. and 75° C.

In one embodiment, the step of contacting the mixture with an effective amount of haloalkylphosphonic acid, e.g., chloroalkylphosphonic acid, to phosphonated the polysaccharide is carried out under agitation for a period of 10 hours or more, typically 12 hours or more, more typically 20 hours or more, even more typically 22 hours or more. In another embodiment, the process of claim further comprises the step of adding a base to the mixture, typically NaOH. In one embodiment, the pH of the mixture is maintained at a pH of least 11. In one embodiment, the pH of the mixture is maintained at a pH of least 11.5. In one embodiment, the pH of the mixture is maintained at a pH of least 12. In a further embodiment, the pH of the mixture is maintained at a pH of least 12.2. In a further embodiment, the pH of the mixture is maintained at a pH of least 12.5. In yet another embodiment, the pH of the mixture is maintained at a pH of least 13. In a further embodiment, the pH of the mixture is maintained at a pH of least 14. In another embodiment, no initiator is added to the process. Typically, the alkyl group of the haloalkylphosphonic acid (e.g., chloroalkylphosphonic acid) is from C1 to C10. In another embodiment, the alkyl group of the haloalkylphosphonic acid is from C1 to C5. In a further embodiment, the alkyl group of the haloalkylphosphonic acid is from C1 to C3. In a further embodiment, the alkyl group of the haloalkylphosphonic acid is from C1 to C2. In one embodiment, the haloalkylphosphonic acid is haloethylphosphonic acid. In another embodiment, the haloalkylphosphonic acid is halomethylphosphonic acid.

In another embodiment, the process further comprises the step of treating the phosphonated polysaccharide with an effective amount of a crosslinker to produce a crosslinked phosphonated polysaccharide. In another embodiment, the phosphonated polysaccharide is in the form of a gel.

In another aspect, described herein are methods of treating a subterranean formation, comprising: providing an oilfield application fluid comprising the phosphonated polysaccharide having a substituent degree of substitution with a lower limit of 0.02 or 0.05 as described herein; and introducing the oilfield application fluid into a wellbore penetrating the subterranean formation.

In one embodiment, the step of introducing the oilfield application fluid into the wellbore penetrating the subterranean formation comprises introducing the oilfield application fluid at a pressure sufficient to create, expand or sustain a fracture in the subterranean formation. The oilfield application fluid can further comprise one or more surfactants, one or more scale inhibitors, one or more stabilizers or any of the foregoing.

BRIEF DESCRIPTION OF DRAWINGS

FIG. 1 shows a chart of the Viscosity (KcP) of crosslinked and non-crosslinked polysaccharides at varying rpms.

DETAILED DESCRIPTION OF INVENTION

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, n-hexyl, and cyclohexyl.

As used herein, the term "aryl" means a monovalent unsaturated hydrocarbon radical containing one or more six-membered carbon rings in which the unsaturation may be represented by three conjugated double bonds, which may be substituted with one or more of carbons of the ring with hydroxy, alkyl, alkenyl, halo, haloalkyl, or amino, including but not limited to, phenoxy, phenyl, methylphenyl, dimethylphenyl, trimethylphenyl, chlorophenyl, trichloromethylphenyl, aminophenyl, and tristyrylphenyl.

As used herein, the term "alkylene" means a divalent saturated straight or branched chain hydrocarbon radical, such as for example, methylene, dimethylene, trimethylene.

As used herein, the terminology "(Cr-Cs)" in reference to an organic group, wherein r and s are each integers, indicates that the group may contain from r carbon atoms to s carbon atoms per group.

As used herein, the terminology "surfactant" means a compound that when dissolved in an aqueous medium lowers the surface tension of the aqueous medium.

As used herein, the term "degree of substitution" as employed herein is the average substitution of functional groups per anhydro sugar unit in the polygalactomannan gum. In guar gum, the basic unit of the polymer consists of two mannose units with a glycosidic linkage and a galactose unit attached to the $C_6$ hydroxyl group of one of the mannose units. On the average, each of the anhydro sugar units contains three available hydroxyl sites. A degree of substitution of 3 would mean that all of the available hydroxyl sites have been esterified with functional groups.

As used herein, it is understood that "oilfield application fluid" means any fluid utilized in the processing, extraction or treatment of oil, which in one embodiment includes fluids utilized in and around an oil-producing well. Some oil application fluids include but are not limited to: well treatment fluids, stimulation fluids, slickwater fluids, drilling fluids, acidizing fluids, workover fluids, completion fluids, packer fluids, subterranean formation treating fluids, mud-reversal fluids, deposit removal fluids (e.g., asphaltene, wax, oil), wellbore cleaning fluids, cutting fluids, carrier fluids, degreasing fluids, fracturing fluids, spacer fluids, hole abandonment fluids, among others.

Workover fluids generally are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc. Fracturing fluids are used in oil recovery operations where subterranean is treated to create pathways for the formation fluids to be recovered.

Slickwater fracturing is a type of oil field fracturing application, which utilizes a low viscosity aqueous fluid to induce, enlarge and/or expand a fracture in a subterranean formation. Generally, slickwater fluids contain water having sufficient friction reducing agent to minimize the tubular friction pressures downhole, which viscosities are slightly higher than water or brine without the friction reducing agent.

In one embodiment, a new functional polysaccharide has been synthesized and a new process has been developed to prepare it. The phosphonated polysaccharide can be prepared from different molecular weight polysaccharides. In one embodiment, the phosphonated polysaccharide is a phosphonated guar or phosphonated derivatized guar.

In one embodiment, the degree of substitution of the phosphonated units within the guar chain can be modified from 0.06 up to 0.7. In one embodiment, phosphonated guars were prepared starting from either native guar or hydroxypropyl guar. Due to the panel of samples which can be prepared, the obtained derivatives could be used in different applications: fracturing for the Oil and Gas industry, flocculation of bauxite in mining, complexes with clay to yield structured gel for cosmetic application, physical complex with ionic liquids to yield ionogel like high strength polyelectrolyte gel for gas adsorption application, agrochemistry.

The reaction does not involve the use of an initiator (or initiator agent) which could be difficult to remove during the purification process. In one embodiment, no initiator is added in the process. In another embodiment, no or minimal initiator is added to the reaction mixture. In another embodiment, no or minimal initiator is added during any steps of the process.

Described herein are phosphonated polysaccharides and methods of preparing such phosphonated polysaccharides. Also described herein are phosphonated polysaccharide compositions and methods of preparing such phosphonated polysaccharide compositions. The polysaccharide compositions, in one embodiment, contain at least one phosphonated polysaccharide and, optionally, at least one additional component.

In one embodiment, oilfield application fluids and oilfield compositions can be prepared utilizing the phosphonated polysaccharide as described herein. Described herein are also methods of treating a subterranean formation, comprising: -providing an oil field application fluid as described herein; and-introducing the oilfield application fluid into a wellbore penetrating the subterranean formation.

In one embodiment, the method of treating a subterranean formation comprises -introducing an oil field composition into a wellbore penetrating the subterranean formation, whereby the oil field composition comprises a phosphonated polysaccharide, as described herein. Introducing the oilfield application fluid or oilfield composition into the wellbore is typically performed at a pressure sufficient to create, expand or sustain a fracture in the subterranean formation.

In one embodiment, the preparation of polysaccharide (which includes derivatives of such polysaccharides), which in one embodiment is a guar, includes reacting the polysaccharide or guar in a semi-dry, dry or powder form suspension to add with a neutralized haloalkylphosphonic acid (e.g., chloroalkylphosphonic acid) solution reagent in water (or a mixture of water and water miscible solvent e.g., alcohol medium). In one embodiment, no catalyst or initiator is added. In one embodiment, the guar is native guar, HPG or CMHPG. Typically, the haloalkylphosphonic acid is neutralized in solution with an alkaline base to adjust the pH to between about 5.5 and 8.5. In some embodiments, the pH of the aqueous solution of haloalkylphosphonic acid and alkaline base is adjusted to between 6 and 8. In another embodiment, the pH of the aqueous solution of haloalkylphosphonic acid and alkaline base is adjusted to between 6.5 and 7.5. In another embodiment, the pH of the aqueous solution of haloalkylphosphonic acid and alkaline base is adjusted to between 6.8 and 7.2.

The temperature of the reaction mixture can be increased to (or is maintained at) between about 40° C. and about 75° C. In one embodiment, the reaction temperature has a lower limit of 60° C. or 65° C. or 70° C. or 75° C. or 80° C. In one embodiment, the reaction temperature is between about 60° C. and about 80° C.

The mixture is stirred or agitated (constantly or at intervals) for a period of time sufficient to ensure complete reaction of the reactants, which, in some embodiments is greater than about 10 hours. In another embodiment, the mixture is agitated constantly or at time intervals for greater than about 12 hours. In another embodiment, the mixture is agitated constantly or at time intervals for greater than about 16 hours. In another embodiment, the mixture is agitated constantly or at time intervals for greater than about 20 hours. In another embodiment, the mixture is agitated constantly or at time intervals for greater than about 22 hours. In another embodiment, the mixture is agitated constantly or at time intervals for greater than about 24 hours.

Thereafter, the resulting material can be neutralized to a neutral pH (e.g., pH about 7). Any acid may be selected for use to neutralize the solution, including strong acids such as hydrochloric acid and sulfuric acid or weak acids such as acetic acid. In one embodiment, acetic acid is used. The amount of acid used is the amount necessary for neutralization.

In another embodiment, the polysaccharide or guar in a semi-dry, dry or powder form is reacted (with or without a derivatizing agent) in a water miscible or immiscible solvent e.g., alcohol medium. This is followed by treatment or with, for example, alkaline base. The alcohol medium is, in one embodiment, aqueous alcohol slurry which provides sufficient water to provide at least slight swelling of the guar while at the same time maintain the integrity of the suspended guar particles.

In one embodiment, the polysaccharide powder, typically guar, is characterized by a mean particle diameter of 10 microns (μm) to 500 microns. In another embodiment, the polysaccharide powder is characterized by a mean particle diameter of 10 microns to 100 microns. In yet another embodiment, the polysaccharide powder is characterized by a mean particle diameter of 10 microns to 50 microns. In one embodiment, the polysaccharide powder is characterized by a mean particle diameter having a lower limit of 30 microns, in another embodiment, having a lower limit of 20 microns, and in another embodiment a preferred lower limit of 10 microns. In one embodiment, the polysaccharide powder is characterized by a mean particle diameter having an upper limit of 500 microns, in another embodiment, having an upper limit of 250 microns, and in another embodiment a preferred upper limit of 100 microns.

The alcohol medium or solvents that are used are, in one embodiment, alcohols including but not limited to monohydric alcohols of 2 to 4 carbon atoms such as ethanol, isopropyl alcohol, n-propanol and tertiary butanol. In one embodiment the alcohol is isopropyl alcohol. The alkaline base that is used in this process is alkali metal hydroxide or ammonium hydroxide, typically, sodium hydroxide. The amount of alkaline base used can vary from about 10 to about 100% and, typically, from about 20 to 50% by weight, based on the weight of polysaccharide, guar or guar derivative utilized.

In some embodiments, a crosslinking agent is used to partially and temporarily crosslink the guar chains during processing, thereby reducing the amount of water absorbed by the guar during the one or more washing steps. Borax (sodium tetra borate) is used in one embodiment, where the crosslinking process takes place under alkaline conditions and is reversible allowing the product to hydrate under acidic conditions. The cross-linker used in process can also aid in making the guar particles harder and therefore less prone to attrition (breaking into small particle size particles) while milling. Maintaining the moisture content of the derivatized splits at a relatively low level, typically a moisture content of less than or equal to about 90 percent by weight, simplifies handling and milling of the washed derivatized splits. In the absence of crosslinking, the moisture content of washed derivatized splits is relatively high and handling and further processing of the high moisture content splits is difficult. In some embodiments, the crosslinked guar is dispersed in water and the boron crosslinking then reversed by adjusting the pH of the guar dispersion, to allow dissolution of the guar to form a viscous aqueous solution.

In one embodiment, the phosphonated polysaccharides (through the phosphonate groups) as described herein, are capable of forming complexes with metal cations (sometimes herein referred to as "complexing group(s)"). The resulting crosslinked phosphonated polysaccharides are capable of forming stable gels having beneficial properties.

Typically, the complexing groups are groups capable of complexing at least one chemical species, typically a metal cation, preferably a multivalent metal cation. In one embodiment, the metal cation is for example selected from $Fe^{3+}$ and/or $Al^{3+}$. In one embodiment, the metal cation is selected from any of: copper compounds, magnesium compounds, titanium compounds, vanadium compounds, iron compounds, aluminum compounds, or mixtures thereof. In some embodiments, the binding energy between the species (typically the cation) and the complexing group is at least 30 kJ/mol, more preferably at least 35 kJ/mol and more preferably at least 40 kJ/mol, or even at least 50 kJ/mol, for example at least 60 kJ/mol. This binding energy, in some embodiments, does not exceed 200 kJ/mol, and may typically remain less than or equal to 150 kJ/mol, typically less than or equal to 120 kJ/mol, for example between 50 and 100 kJ mol.

In one embodiment, the polysaccharides include, as a complexing groups, phosphonic acid groups —$PO_3H$ (possibly deprotonated in whole or part e.g., phosphonate) and/or phosphoric acid —O—$PO_3H$ (optionally deprotonated in whole or part for example in the form of phosphonate), which are groups capable of complexing a large number of metal cations, particularly $Fe^{3+}$ cations and/or $Al^{3+}$, among others.

In one embodiment, the phosphonated polysaccharide comprises complexing groups capable of complexing at least a metal cation, with a bonding energy between complexing agent and cation of at least 30 KJ/mol. The complexing group comprises in some embodiments, phosphonic acid —$PO_3H$, optionally deprotonated entirely or partially, and/or phosphoric acid —O—$PO_3H$, optionally deprotonated in whole or part. The metal cation can be $Fe^{3+}$ and/or $Al^{3+}$, among other listed herein In some embodiments, the crosslinking agents include but are not limited to copper compounds, vanadium compounds, zirconium compounds, for example zirconium (IV), magnesium compounds, glyoxal, titanium compounds, for example, titanium (IV), calcium compounds, iron compounds, aluminum compounds, p-benzoquinone, dicarboxylic acids and their salts, compounds and phosphate compounds.

After the reaction, the obtained product is separated by sedimentation, such as but not limited to centrifugation, or filtration (for both split and powder processes). Prior to such separation, however, intermediate steps can be taken to purify the product, such as washing. One or more washing steps can be utilized. In one embodiment, purifying the product in a washing process comprises a first washing step with water or water/solvent mixture and/or a second washing step with a diluted or undiluted water-solvent mixture (e.g., solvent process).

In one embodiment, the product can be washed with an aqueous medium by contacting the guar or derivatized guar with the aqueous medium and then physically separating the aqueous wash medium, which is in the form of process water or effluent (or guar processing side stream), from the guar or derivatized guar particles. In some embodiments, the process water can contain residual reactants, traces of the final product, and/or impurities such as by products and un-reacted reagents. For example, after the reaction process the swollen splits are dewatered in a filtration system, which is shaken to remove the wash effluent from the solids (solid-liquid separation). The filtration system, in one embodiment, utilizes mesh screening to remove all the process water along with particles smaller than the screen mesh opening. Removal of the liquids from solid guar particles can be through, for example, centrifugal force, gravity or pressure gradient. Examples include sieve filtering, high flow rate centrifugal screening, centrifugal sifters, decanting centrifuges, and the like. In one embodiment, the mesh screen from about 100 mesh (150 microns) to about 500 mesh (25 microns). In other embodiments, the mesh screen can be up to 700 mesh or greater.

In one embodiment, the polysaccharide is a locust bean gum. Locust bean gum or carob bean gum is the refined endosperm of the seed of the carob tree, *Ceratonia siliqua*. The ratio of galactose to mannose for this type of gum is about 1:4. In one embodiment, the polysaccharide is a tara gum. Tara gum is derived from the refined seed gum of the tara tree. The ratio of galactose to mannose is about 1:3.

In one embodiment, the polysaccharide is a polyfructose. Levan is a polyfructose comprising 5-membered rings linked through β-2,6 bonds, with branching through β-2,1 bonds. Levan exhibits a glass transition temperature of 138° C. and is available in particulate form. At a molecular weight of 1-2 million, the diameter of the densely-packed spherulitic particles is about 85 nm.

In one embodiment, the polysaccharide is a xanthan. Xanthans of interest are xanthan gum and xanthan gel. Xanthan gum is a polysaccharide gum produced by Xathomonas campestris and contains D-glucose, D-mannose, D-glucuronic acid as the main hexose units, also contains pyruvate acid, and is partially acetylated.

In one embodiment, the polysaccharide of the present invention is derivatized or non-derivatized guar. Guar comes from guar gum, the mucilage found in the seed of the leguminous plant Cyamopsis tetragonolobus. The water soluble fraction (85%) is called "guaran," which consists of linear chains of (1,4)-β-D mannopyranosyl units-with α-D-galactopyranosyl units attached by (1,6) linkages. The ratio of D-galactose to D-mannose in guaran is about 1:2.

The guar seeds used to make guar gum are composed of a pair of tough, non-brittle endosperm sections, hereafter referred to as "guar splits," between which is sandwiched the brittle embryo (germ). After dehulling, the seeds are split, the germ (43-47% of the seed) is removed by screening. The splits typically contain about 78-82% galactomannan polysaccharide and minor amounts of some proteinaceous material, inorganic salts, water-insoluble gum, and cell membranes, as well as some residual seedcoat and seed embryo.

In one embodiment, the polysaccharide is selected from guar or derivatized guar.

In one embodiment, the polysaccharide is selected from guar, carboxymethyl guar (CMG), hydroxyethyl guar (HEG), hydroxypropyl guar (HPG), carboxymethylhydroxypropyl guar (CMHPG), cationic guar, cationic carboxymethyl guar (CMG), cationic hydroxyethyl guar (HEG), cationic hydroxypropyl guar (HPG), cationic carboxymethylhydroxypropyl guar (CMHPG), hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar), hydrophobically modified cationic guar (HM cationic guar) or any combination thereof.

The polysaccharide is, in an alternate embodiment, selected from the group comprising: guar (i.e., native guar), carboxymethyl guar (CMG), hydroxyethyl guar (HEG), hydroxypropyl guar (HPG), carboxymethylhydroxypropyl guar (CMHPG), cationic guar, cationic carboxymethyl guar (CMG), cationic hydroxyethyl guar (HEG), cationic hydroxypropyl guar (HPG), or any combination thereof. In yet another more preferred embodiment, the polysaccharide is selected from hydroxypropyl guar (HPG), carboxymethylhydroxypropyl guar (CMHPG), cationic hydroxypropyl guar (cationic HPG), cationic carboxymethylhydroxypropyl guar (cationic CMHPG) or any combination thereof.

In an alternative embodiment, the polysaccharide is any one of the following: galactomannan derivatives, glucomannan derivatives, agar, dextran, polyglucose, polyaminoglycan, xanthan polymers, hemicelluloses (xyloglycans, xyloglucans, mannoglycans and mixed-linkage beta-glucans), pectins (d-galacturonan) and lignin. In one embodiment, the polysaccharide is a cationic polysaccharide, such as, for example, cationic cellulose derivatives, cationic starch derivatives, and cationic guar gum derivatives. In another embodiment, cationic polysaccharide include salts of hydroxyethyl cellulose reacted with trimethyl ammonium substituted epoxide (such as Polyquaternium 10), polymeric quaternary ammonium salts of hydroxyethyl cellulose reacted with lauryl dimethyl ammonium-substituted epoxide (such as Polyquaternium 24), guar hydroxypropyltrimonium chloride, hydroxypropyl guar hydroxypropyltrimonium chloride and cationic protein derivatives, such as cocodimonium hydroxypropyl hydrolyzed wheat protein.

In one embodiment the polysaccharide is guar or a derivatized guar. In some embodiments, the polysaccharide can be selected from any of the following: guar, unwashed guar gum, washed guar gum, cationic guar, carboxymethyl guar (CM guar), hydroxyethyl guar (HE guar), hydroxypropyl guar (HP guar), carboxymethylhydroxypropyl guar (CMHP guar), cationic guar, hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar), hydrophobically modified cationic guar (HM cationic guar), guar hydroxypropyl trimonium chloride, hydroxypropyl guar hydroxypropyl trimonium chloride, starch, corn, wheat, rice, potato, tapioca, waxy maize, sorghum, waxy sarghum, sago, dextrin, chitin, chitosan, alginate compositions, xanthan gum, carageenan gum, cassia gum, tamarind gum, cationic cellulose, cationic polyacrylamide, cationic starch, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing or a combination of any of the foregoing.

In one embodiment, the starting materials in the process is a derivatized, polysaccharide, typically hydroxypropyl guar or carboxymethylhydroxypropyl guar. (i.e., these materials can considered the starting materials for some embodiments of the process as described herein).

In one embodiment, the starting nonionically substituted guar gum is then treated with an alcohol or an alcohol/water solution. In one embodiment, the alcohol selected may be methanol, ethanol, isopropanol, n-propyl alcohol, n-butyl alcohol and the like. The alcohols may be used in neat (100%) form or in combination with water, the primary consideration being that the alcohol is miscible with water. Treatment is typically made at elevated temperatures, for example, above 50° C. or 60° C., although the temperature can be increased to about 70° C. or greater.

In one embodiment, mixtures of water and organic solvents are utilized, at between about 10 to about 90 percent water by weight and between about 90 to about 10 percent organic solvent by weight. In another embodiment, the use is of between about 80 to about 90% by weight isopropyl alcohol and between about 10 to about 20% by weight water, or in yet another embodiment the solution selected for use is an isopropanol/water mixture, wherein the respective amounts by weight are 85% isopropanol and 15% water.

In one embodiment, the amount of alcohol or alcohol water solution to be used in is generally that amount which is necessary to fully saturate the guar powder. In practice, this amount is usually at least twice the amount by weight of the starting guar powder, and even more preferably, at least three times the amount by weight of the starting guar powder.

The compositions described herein can also contain cationic, anionic, amphoteric or zwitterionic surfactants, as described in greater detail below.

The viscoelastic surfactants include zwitterionic surfactants and/or amphoteric surfactants and cationic surfactants. A zwitterionic surfactant has a permanently positively charged moiety in the molecule regardless of pH and a negatively charged moiety at alkaline pH. A cationic surfactant has a positively charged moiety regardless of pH. An amphoteric surfactant has both a positively charged moiety and a negatively charged moiety over a certain pH range (e.g., typically slightly acidic), only a negatively charged moiety over a certain pH range (e.g., typically slightly alkaline) and only a positively charged moiety at a different pH range (e.g., typically moderately acidic).

In one embodiment, the cationic surfactant is selected from i) certain quaternary salts and ii) certain amines, iii) amine oxide, iv) and combinations thereof.

The quaternary salts have the structural formula:

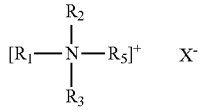

wherein $R_1$ is a hydrophobic moiety of alkyl, alkylarylalkyl, alkoxyalkyl, alkylaminoalkyl or alkylamidoalkyl. $R_1$ has from about 18 to about 30 carbon atoms and may be branched or straight-chained and saturated or unsaturated. Representative long chain alkyl groups include octadecentyl (oleyl), octadecyl (stearyl), docosenoic (erucyl) and the derivatives of tallow, coco, soya and rapeseed oils. The preferred alkyl and alkenyl groups are alkyl and alkenyl groups having from about 18 to about 22 carbon atoms.

$R_2$, $R_3$, and $R_5$ are, independently, an aliphatic group having from 1 to about 30 carbon atoms or an aromatic group having from 7 to about 15 carbon atoms. The aliphatic group typically has from 1 to about 20 carbon atoms, more typically from 1 to about 10 carbon atoms, and most typically from 1 to about 6 carbon atoms. Representative aliphatic groups include alkyl, alkenyl, hydroxyalkyl, carboxyalkyl, and hydroxyalkyl-polyoxyalkylene. The aliphatic group can be branched or straight-chained and saturated or unsaturated. Preferred alkyl chains are methyl and ethyl. Preferred hydroxyalkyls are hydroxyethyl and hydroxypropyl. Preferred carboxyalkyls are acetate and propionate. Preferred hydroxyalkyl-polyoxyalkylenes are hydroxyethyl-polyoxyethylene and hydroxypropyl-polyoxypropylene. Examples of aromatic moieties include cyclic groups, aryl groups, and alkylaryl groups. A preferred alkylaryl is benzyl.

X is suitable anion, such as Cl⁻, Br⁻, and $(CH_3)_2SO_4^-$.

Representative quaternary salts of the above structure include methylpolyoxyethylene(12-18)octadecanammonium chloride, methylpolyoxyethylene(2-12)cocoalkylammonium chloride, and isotridecyloxypropyl polyoxyethylene (2-12) methyl ammonium chloride.

The amines have the following structural formula:

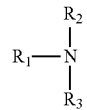

wherein $R_1$, $R_2$, and $R_3$ are as defined above.

Representative amines of the above structure include polyoxyethylene(2-15) cocoalkylamines, polyoxyethylene (12-18)tallowalkylamines, and polyoxyethylene(2-15)oleylamines.

Selected zwitterionic surfactants are represented by the following structural formula:

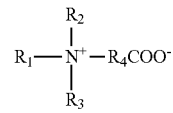

wherein $R_1$ is as described above. $R_2$ and $R_3$ are, independently, an aliphatic moiety having from 1 to about 30 carbon atoms or an aromatic moiety having from 7 to about 15 carbon atoms. The aliphatic moiety typically has from 1 to about 20 carbon atoms, more typically from 1 to about 10 carbon atoms, and most typically from 1 to about 6 carbon atoms. The aliphatic group can be branched or straight chained and saturated or unsaturated. Representative aliphatic groups include alkyl, alkenyl, hydroxyalkyl, carboxyalkyl, and hydroxyalkyl-polyoxyalkylene. Preferred alkyl chains are methyl and ethyl. Preferred hydroxyalkyls are hydroxyethyl and hydroxypropyl. Preferred carboxyalkyls are acetate and propionate. Preferred hydroxyalkyl-polyoxyalkylenes are hydroxyethyl-polyoxyethylene or hydroxypropyl-polyoxypropylene). $R_4$ is a hydrocarbyl radical (e.g. alkylene) with chain length 1 to 4 carbon atoms. Preferred are methylene or ethylene groups. Examples of aromatic moieties include cyclic groups, aryl groups, and alkylaryl groups. A preferred arylalkyl is benzyl.

Specific examples of selected zwitterionic surfactants include the following structures:

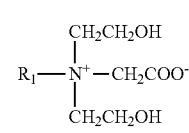

II

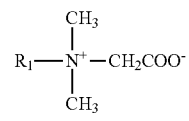

III

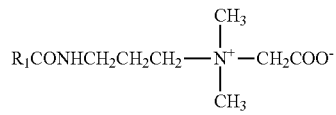

IV

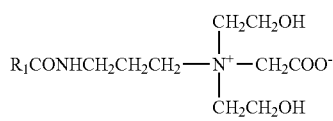

wherein $R_1$ is as described above.

Other representative zwitterionic surfactants include dihydroxyethyl tallow glycinate, oleamidopropyl betaine, and erucyl amidopropyl betaine.

Selected amphoteric surfactants useful in the viscoelastic surfactant fluid of the present invention are represented by the following structural formula:

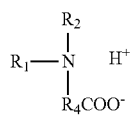

wherein $R_1$, $R_2$, and $R_4$ are as described above.

Specific examples of amphoteric surfactants include those of the following structural formulas:

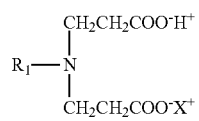

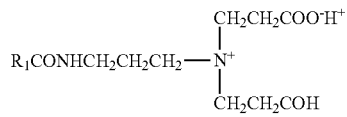

wherein R1 is as described above. X+ is an inorganic cation such as Na+, K+, $NH_4$+ associated with a carboxylate group or hydrogen atom in an acidic medium.

The oil field compositions described herein, in alternative embodiments, can include (in either the product, process of making of), various other additives. Non-limiting examples include stabilizers, thickeners, corrosion inhibitors, mineral oils, enzymes, ion exchangers, chelating agents, dispersing agents, clay (e.g., Bentonite and attapulgite) and the like.

EXPERIMENTS

Hydration in Brine Solution

A 15% NaCl/10% $CaCl_2.2H2O$ brine solution was made by adding 300 gm of sodium chloride and 200 gm of calcium chloride dehydrate to 1500 gm of water to make the brine solution called brine 1.

250 ml of brine 1 was taken in a blender jar and 2.4 gm of appropriate phosphonated guar/phosphonated guar derivatives was added to make a solution with concentration of 9.6 gm/liter. The mixing was continued for about 15 minutes and then set aside. The viscosity was measured after 24 hours using a model OFITE 900 viscometer at 511/sec and 75 F. The samples and the appropriate viscosities are shown in Table 1.

TABLE 1

| Sample ID | Viscosity, cP | DS of phosphonate | |
|---|---|---|---|
| S1161-124 | 2.8 | 0.67 | Phosphonated guar |
| S1161-140 | 28.7 | 0.05 | Phosphonated HPG |
| S1161-137 | 10.9 | 0.24 | Phosphonated HPG |
| S1161-134 | 22.4 | 0.25 | Phosphonated guar |
| S1161-131 | 3.2 | 0.37 | Phosphonated guar |
| S1161-127 | 7.2 | 0.53 | Phosphonated HPG |

Crosslinking Test

To 250 ml of deionized water, 5 gm of potassium chloride was added in a blender. While mixing, then 1.8 gm of phosphonated HPG with a DS of 0.05 was added to make a solution of 7.2 gm/liter. Mixing was continued and then set aside. The viscosity was measured after 1 hr to be 29 cP. Then, 1.2 gm of sodium thiosulfate was added as high temperature stabilizer and the pH was adjusted using a 25% potassium carbonate solution to 9.5. Then 0.1 ml of Tyzor 217 (a zirconium lactate crosslinker from Dorf-Ketal) crosslinker was added. Then about 45 ml of solution was transferred to the cup of a Chandler high temperature, high pressure viscometer using R1B5 geometry. The sample had already crosslinked before the Chandler high temperature, high pressure viscometer was started which took approximately 5 minutes. The sample was heated from room temperature to 250 F and maintained at 250 F. The viscosity during the test @100/sec in shown in the following Table 2.

TABLE 2

| Time (min) | Start | 5 min | 10 min | 15 min | 30 min | 60 min | 90 min | 120 min |
|---|---|---|---|---|---|---|---|---|
| Viscosity, cP | 900 | 1480 | 467 | 830 | 871 | 732 | 588 | 513 |
| Temp (F.) | 75 | 80 | 187 | 240 | 247 | 247 | 247 | 247 |

Preparing a 0.5% by weight phosphonated-HPG/Fe(III) gel (150 g)

In an 8 oz wide-mouth glass jar, 99 g of DI water and 0.9 g of phosphonated-HPG (10% moisture) are introduced at room temperature. The mixture is stirred with an Ultra Turrax homogenizer (Power=1) for 5 min. In a 60 mL plastic jar, $FeCl_3 6H2O$ and deionized (DI) water are introduced, and then stirred at room temperature to dissolve. The ferric ion solution is subsequently added to the phosphonated-HPG solution, while under stirring using a magnetic stir bar. The final mixture is left to sit overnight.

The gel apparent viscosity is evaluated with a Brookfield RV DV-II+® viscometer at room temperature and 20 rpm. A small sample adaptor is used comprising the sample chamber SC4-13R and the spindle SC4-25 or SC4-31 depending on the magnitude of the gel apparent viscosity. 13 g of gel are inserted into the chamber using spatulas or wide-tip plastic pipette. The viscosity value is read after a 3 minute equilibration time.

The viscosity value was read after a 3 minute equilibration time, and the value was 22.3 KcP.

Procedure for 0.5% wt phosphonated-guar gel/Fe(III) (150 g)

In an 8 oz wide-mouth glass jar, 99 g of DI water and 0.9 g of phosphonated-guar (10% moisture) are introduced at room temperature. The mixture is stirred with an Ultra Turrax homogenizer (Power=1) for 5 min. In a 60 mL plastic container, FeCl$_3$.6H2O and deionized (DI) water are introduced, and then stirred at room temperature to dissolve. The ferric ion solution is subsequently added to the phosphonated-guar solution, while under vigorous stirring using a magnetic stir bar. The final mixture is left to sit overnight.

The gel apparent viscosity is evaluated with a Brookfield RV DV-II+® viscometer at room temperature and 20 rpm. A small sample adaptor is used comprising the sample chamber SC4-13R and the spindle SC4-25 or SC4-31 depending on the magnitude of the gel apparent viscosity. 13 g of gel are inserted into the chamber using spatulas or wide-tip plastic pipette.

Referring to FIG. 1, the viscosity value is read after a 3 minute equilibration time, and the value was 19 KcP, as shown in Table 3 below.

Procedure for the preparation of 0.5% wt phosphonated-HPG/Al (III) gel (150 g).

In an 8 oz wide-mouth glass jar, 99 g of DI water and 0.9 g of phosphonated-HPG (10% moisture) are introduced at room temperature. The mixture is stirred with an Ultra Turrax homogenizer (Power=1) for 5 min. In a 60 mL plastic container, AlCl$_3$.6H2O and DI water are introduced, and then stirred at room temperature to dissolve. The aluminum ion solution is subsequently added slowly with a plastic pipette to the phosphonated-guar solution, while under vigorous stirring using a magnetic stir bar.

The final mixture is left to sit overnight. The gel apparent viscosity is evaluated with a Brookfield RV DV-II+® viscometer at room temperature and 20 rpm. A small sample adaptor is used comprising the sample chamber SC4-13R and the spindle SC4-25 or SC4-31 depending on the magnitude of the gel apparent viscosity. 13 g of gel are inserted into the chamber using spatulas or wide-tip plastic pipette.

Referring to FIG. 1, the viscosity value is read after a 3 minute equilibration time, and the value was 18.9 KcP, as shown in Table 3 below.

Procedure for the preparation of 0.5% CMHPG+Zr crosslinker.

In a blender, 500 mL of DI water were introduced, followed by the addition of: choline chloride solution and carboxymethyl hydroxypropyl guar (CMHPG). The pH is then lowered. The above mixture is mixed in the blender at 1500 rpm for 2 minutes, and then allowed to hydrate by sitting at room temperature. 250 g of the above mixture is removed and its pH is adjusted to 10-10.5, by addition of potassium carbonate. Zirconium crosslinker is then added. The latter mixture is mixed for 15 seconds before proceeding to read its viscosity.

The gel apparent viscosity is evaluated with a Brookfield RV DV-II+® viscometer at room temperature and 20 rpm. A small sample adaptor is used comprising the sample chamber SC4-13R and the spindle SC4-25 or SC4-31 depending on the magnitude of the gel apparent viscosity. 13 g of gel are inserted into the chamber using spatulas or wide-tip plastic pipette. The viscosity value is read after a 3 minute equilibration time.

Referring to FIG. 1, the viscosity value was read after a 3 minute equilibration time, and the value was 18.4 KcP, as shown in Table 3 below.

TABLE 3

| | Sample | |
|---|---|---|
| | SC4-31/13R 0.5 rpm | SC4-25/13R 20 rpm |
| 0.5% HPG | 3.2 KcP | 1.2 KcP |
| 0.5% Native guar | 3.2 KcP | 1.3 KcP |
| 0.5% Xanthan gum | 21.7 KcP | 1.2 KcP |
| 0.5% Phos-HPG + Al (crosslinker) | 114 KcP | 18.9 KcP |
| 0.5% Phos-HPG + Fe (crosslinker) | 130 KcP | 22.3 KcP |
| 0.5% CMHPG + Zr lactate (crosslinker) | 105 KcP | 18.4 KcP |

The gels apparent viscosity are evaluated with a Brookfield RV DV-II+® viscometer at room temperature and 20 rpm. A small sample adaptor is used comprising the sample chamber SC4-13R and the spindle SC4-25 or SC4-31 depending on the magnitude of the gel apparent viscosity. 13 g of gel are inserted into the chamber using spatulas or wide-tip plastic pipette. The viscosity value is read after a 3 minute equilibration time. A 0.5g of polysaccharide, namely hydroxypropyl guar, native guar and xanthan gum are added to 99.5% of DI water upon stirring, and allowed to sit at room temperature overnight, before measuring viscosity It should be apparent that embodiments and equivalents other than those expressly discussed above come within the spirit and scope of the present invention. Thus, the present invention is not limited by the above description but is defined by the appended claims.

What is claimed is:

1. A process to produce a phosphonated polysaccharide gel composition comprising at least one phosphonated guar, at least one phosphonated guar derivative, or mixtures thereof, the process comprising:
   contacting an effective amount of haloalkylphosphonic acid to an aqueous or semi-aqueous polysaccharide mixture, the polysaccharide mixture comprising at least one polysaccharide selected from at least one guar, at least one guar derivative, or mixtures thereof, to phosphonate the polysaccharide, wherein the resulting phosphonated polysaccharide has a substituent degree of substitution with a lower limit of 0.05 and an upper limit of 3, and a weight average molecular weight with an upper limit of 5,000,000 g/mole; and
   crosslinking the phosphonated polysaccharide with a metal cation to form a phosphonated polysaccharide gel, wherein the metal cation is selected from compounds of iron and wherein the binding energy is at least 40 kJ/mol.

2. The process of claim 1 wherein the lower limit of the substituent degree of substitution is 0.055.

3. The process of claim 1 wherein the lower limit of the substituent degree of substitution is 0.7.

4. The process of claim 1 wherein the lower limit of the substituent degree of substitution is 1.

5. The process of claim 1 wherein the phosphonated polysaccharide is selected from phosphonated guar; phosphonated carboxymethyl guar (CMG); phosphonated hydroxyethyl guar (HEG); phosphonated hydroxypropyl guar (HPG); phosphonated carboxymethylhydroxypropyl guar (CMHPG); phosphonated hydrophobically modified guar (HM guar); phosphonated hydrophobically modified carboxymethyl guar (HMCM guar); phosphonated hydrophobically modified hydroxyethyl guar (HMHE guar); phosphonated hydrophobically modified hydroxypropyl guar (HMHP guar; phosphonated hydrophobically modified carboxymethylhydroxypropyl guar (HMCMHP guar); or any combination thereof.

6. The process of claim 1 wherein the at least one phosphonated polysaccharide is selected from phosphonated cationic carboxymethyl guar (CMG), phosphonated cationic hydroxyethyl guar (HEG), phosphonated cationic hydroxypropyl guar (HPG), phosphonated cationic carboxymethylhydroxypropyl guar (CMHPG), phosphonated cationic hydrophobically modified hydroxypropyl guar (cationic HMHP guar), phosphonated hydrophobically modified cationic guar (HM cationic guar) or any combination thereof.

7. The process of claim 1 wherein contacting the polysaccharide mixture with an effective amount of the haloalkylphosphonic acid to phosphonated the polysaccharide is carried out at a temperature of between 60° C. and 90° C.

8. The process of claim 1 wherein contacting the polysaccharide mixture with an effective amount of the haloalkylphosphonic acid to phosphonate the polysaccharide is carried out under agitation for a period of 10 hours or more.

9. The process of claim 1 wherein the haloalkylphosphonic acid is chloroalkylphosphonic acid.

10. The process of claim 1 further comprising the step of adding a base to the mixture.

11. The process of claim 2 wherein no initiator is added during the reaction.

12. A method of treating a subterranean formation, comprising:
introducing an oilfield application fluid into a wellbore penetrating the subterranean formation, the oilfield application fluid comprising a polysaccharide composition comprising at least one phosphonated guar, at least one phosphonated guar derivative, or mixtures thereof, the polysaccharide composition having a substituent degree of substitution with a lower limit of 0.05 and an upper limit of 3, and having a weight average molecular weight with an upper limit of 5,000,000 g/mole; and
crosslinking the polysaccharide composition with a metal cation to form a phosphonated polysaccharide gel, wherein the metal cation is selected from compounds of iron and wherein the binding energy is at least 40 kJ/mol.

13. The method of claim 12 wherein the step of introducing the oilfield application fluid into the wellbore penetrating the subterranean formation comprises introducing the oilfield application fluid at a pressure sufficient to create, expand or sustain a fracture in the subterranean formation.

14. The method of claim 12 wherein the oilfield application fluid further comprises one or more surfactants, one or more scale inhibitors, one or more stabilizers or any combination of the foregoing.

15. The process of claim 1 wherein the contacting the polysaccharide mixture with an effective amount of the haloalkylphosphonic acid to phosphonated the polysaccharide is carried out at a temperature of between 60° C. and 80° C.

16. The process of claim 1 wherein the contacting the polysaccharide mixture with an effective amount of the haloalkylphosphonic acid to phosphonated the polysaccharide is carried out at a temperature of between 65° C. and 75° C.

17. The process of claim 1 wherein contacting the polysaccharide mixture with an effective amount of the haloalkylphosphonic acid to phosphonate the polysaccharide is carried out under agitation for a period of 12 hours or more.

18. The process of claim 1 wherein contacting the polysaccharide mixture with an effective amount of the haloalkylphosphonic acid to phosphonate the polysaccharide is carried out under agitation for a period of 20 hours or more.

19. The process of claim 1 wherein contacting the polysaccharide mixture with an effective amount of the haloalkylphosphonic acid to phosphonate the polysaccharide is carried out under agitation for a period of 22 hours or more.

20. The process of claim 1 further comprising adding NaOH to the mixture.

* * * * *